United States Patent [19]

Paulsen

[11] Patent Number: 5,054,590
[45] Date of Patent: Oct. 8, 1991

[54] CONTROL DEVICE AND METHOD FOR A PRESSURE ACTUATABLE BRIDGING COUPLING OF A HYDRODYMANIC TORQUE CONVERTER

[75] Inventor: Lutz Paulsen, Stuttgart, Fed. Rep. of Germany

[73] Assignee: Daimler-Benz AG, Stuttgart, Fed. Rep. of Germany

[21] Appl. No.: 517,189

[22] Filed: May 1, 1990

[30] Foreign Application Priority Data

Oct. 5, 1989 [DE] Fed. Rep. of Germany ....... 3915186

[51] Int. Cl.$^5$ ............................................. F16H 45/02
[52] U.S. Cl. ...................................... 192/3.3; 192/3.29
[58] Field of Search .................. 192/3.29, 3.3, 109 F; 74/890; 475/65

[56] References Cited

U.S. PATENT DOCUMENTS

| 2,824,632 | 2/1958 | Lucia et al. | 192/3.3 |
| 2,965,202 | 12/1960 | Christenson | 192/3.3 |
| 3,096,666 | 7/1963 | Christenson et al. | 74/890 X |
| 3,241,399 | 3/1966 | Fisher et al. | 192/3.3 X |
| 3,330,170 | 7/1967 | Rains et al. | 74/890 |
| 3,691,872 | 9/1972 | Schaefer et al. | 192/3.29 X |
| 4,828,084 | 5/1989 | Hasegawa et al. | 192/3.3 |

Primary Examiner—Richard Lorence
Attorney, Agent, or Firm—Evenson, Wands, Edwards, Lenahan & McKeown

[57] ABSTRACT

A hydrodynamic torque converter has a bridging coupling. An axial piston arranged in the converter housing is subjected to a working pressure for engagement of the bridging coupling and to an internal housing pressure acting in the opposite direction. A sensor operative relative to a reference control pressure controls working pressure. To obtain an analogous dependence on the internal housing pressure otherwise measurable only with special measures, the reference control pressure is set by means of a pressure-regulating valve working as a function both of the inflow pressure and of the flow-off pressure of the hydrodynamic working circuit.

3 Claims, 1 Drawing Sheet

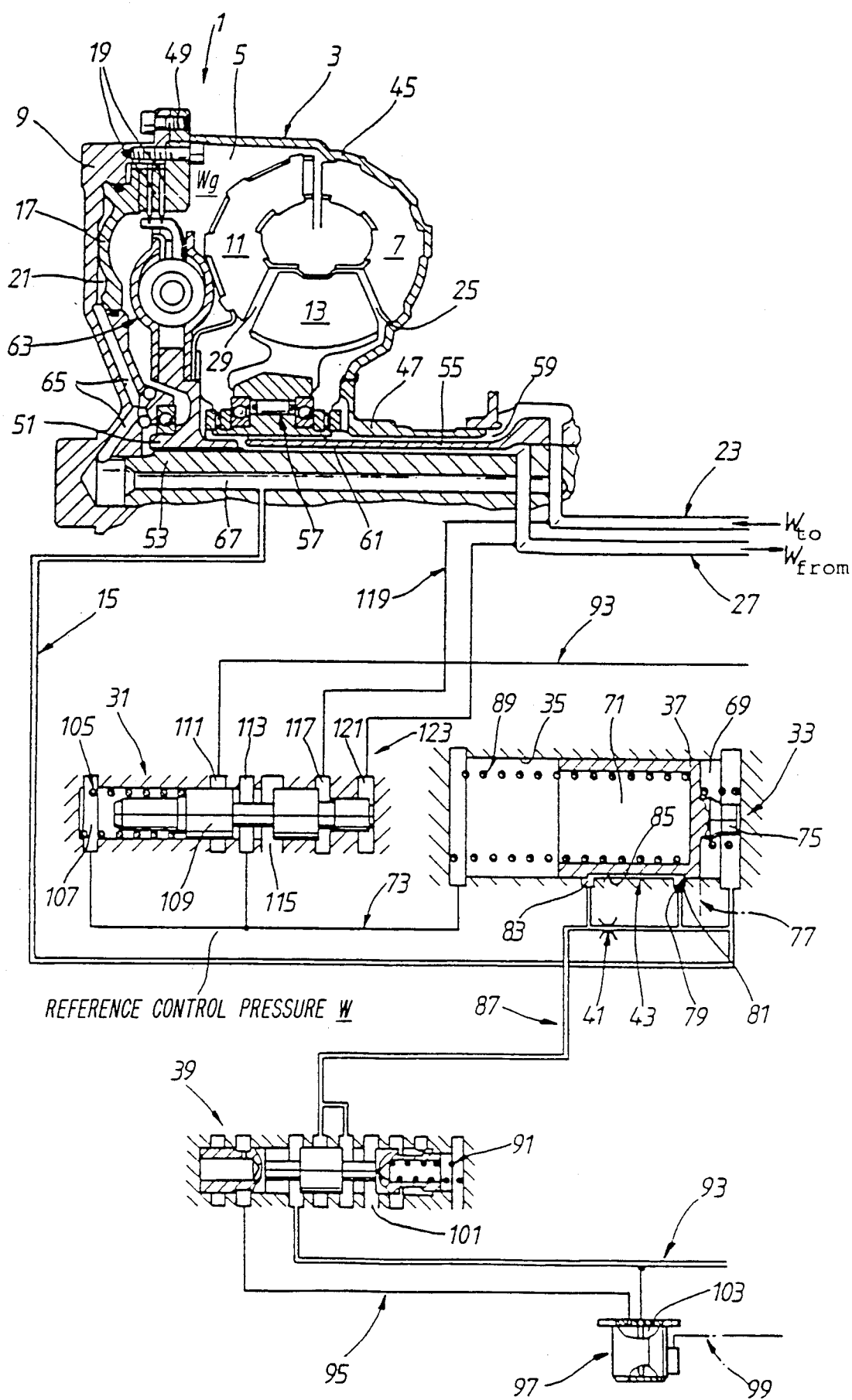

CONTROL DEVICE AND METHOD FOR A PRESSURE ACTUATABLE BRIDGING COUPLING OF A HYDRODYMANIC TORQUE CONVERTER

BACKGROUND AND SUMMARY OF THE INVENTION

The present invention relates to a control device and method for a pressure-actuatable bridging coupling of a hydrodynamic torque converter and, more particularly, to a control device in which a pressure regulating valve is connected to a pressure-medium feed system, to a pressure-medium discharge system and to a sensor to avoid the need to increase the pressure level of the hydrodynamic working circuit to engage the bridging coupling.

In known controls for a bridging coupling, the bridging coupling is disengaged by bringing the working pressure of the working-pressure chamber to a higher value than the so-called converter counter pressure which subjects the respective axial piston to pressure in the opposite direction and which exists in the housing interior axially bounded by the radial housing wall and the turbine wheel. For the purpose of engaging the bridging coupling, this type of control device continues to work by relieving the working-pressure chamber and increasing the converter counter pressure. The increase in the converter counter pressure is obtained by increasing the converter inflow pressure and therefore the total pressure of the hydrodynamic working circuit. Since the housing interior communicates with the hydrodynamic working circuit via the gap between the outflow end of the pump wheel and the adjacent inflow end of the turbine wheel, when there is an increase in the pressure level there also necessarily occurs in the working circuit an increased internal housing pressure, in other words, an increased converter counter pressure results and subjects the axial piston to pressure to engage the bridging coupling. The increase in the pressure level of the hydrodynamic working circuit for the purpose of engaging the bridging coupling is a disadvantage because the converter should actually be cutoff; an increased pressure level is not needed at all. Furthermore, there is an increased danger that the converter housing will expand at the high converter speeds occurring in the coupling mode. The known control device takes measures, at relatively low converter speeds, to operate the bridging coupling as a torsion damper with slip during acceleration, but during deceleration to select rigid bridging so as to allow engine braking.

An object of the present invention is to provide a control device and method in which an increase in the pressure level of the hydrodynamic working circuit for the purpose of engaging the bridging coupling is unnecessary and it is possible to affect the working pressure during the engagement of the bridging coupling.

The foregoing object has been achieved by connecting a pressure regulating valve to a pressure-medium feed system, to a pressure-medium discharge system and to a sensor. A reference control pressure is set as a function of converter inflow pressure and converter flow-off pressure analogous to the internal housing pressure of the converter housing. A separating piston is axially displaceable in a bore of the sensor and is connected to a working pressure line so as to be operated by a spring bias and the reference control pressure and also by the working pressure of the working pressure chamber.

In the control device and method according to the present invention, the working pressure acts in the direction of engagement, so that the hydrodynamic working circuit is not subjected to pressure during the actuation of the coupling and therefore no swelling of the converter housing can occur under these circumstances.

In the control device and method according to the invention, the converter housing receiving three bladed wheels and additionally the bridging coupling, together with its actuator, does not have to be equipped with additional passage points for the direct measurement of the converter counter pressure acting counter to the working pressure on the axial piston. A reference control pressure corresponding to the converter counter pressure and composed of the converter inflow pressure and convertor flow-off pressure is set and is activated in a sensor for influencing the behavior of the working pressure during the engagement of the bridging coupling.

To make it possible to obtain a rapid filling of the emptied working-pressure chamber after the initiation of the engagement operation and a subsequent ramp-like behavior of the working pressure during engagement, a coupling control valve is connected to the working pressure line via a throttle and a bypass control valve operating in dependence on the sensor. The bypass control valve is held in a position cutting off the throttle when the working pressure is equal to or lower than the reference control pressure reduced by the amount of tension exerted by a spring.

BRIEF DESCRIPTION OF THE DRAWINGS

These and further objects, features and advantages of the present invention will become more apparent from the following detailed description of a presently preferred embodiment when taken in conjunction with the accompanying sole FIGURE which is a schematic representation of the control device of a pressure-actuatable bridging coupling of a hydrodynamic torque converter in accordance with the present invention.

DETAILED DESCRIPTION OF THE DRAWINGS

A hydrodynamic torque converter 1 has a converter housing 3 which is driven in a known way by an engine. The converter is composed essentially of a radial housing wall 9, a so-called converter bell 45 and central hollow shaft 47. The converter bell 45 is connected, at one location, by a flange 49 to the housing wall 9 and, at another location, by a welded joint to the hollow shaft 47 used for driving a primary-pressure pump. In both locations, the connections fix the bell 45 in terms of rotation and in a fluid-tight manner.

Arranged in the interior 5 of the converter housing 3 in succession in an axial direction from the housing wall 9 to the hollow shaft 47 are an annular axial piston 17, a bridging coupling 19 of the multiple-disc type, a turbine wheel 11 and a pump wheel 7. The blades of the pump wheel 7 are fixed in terms of rotation relative to the converter bell 45 and generate a hydrodynamic working circuit which is completed, respectively, by blades of the turbine wheel 11 and of a guide wheel 13 arranged in terms of flow between the turbine wheel 11 and pump wheel 7. A hub 51 is fixedly connected, rotationally speaking, to the turbine wheel 11 and likewise fixedly connected, rotationally speaking, to a centrally located internal turbine-wheel shaft 53.

A hollow stator shaft 55 is fixed so as to be non-rotatable relative to a transmission housing (only a portion of which is shown) in a known manner and is arranged concentrically between hollow shaft 47 and turbine-wheel shaft 53. The guide wheel 13 is non-rotatably supported in a conventional manner, via a freewheel coupling 57, on the stator shaft 55 in a direction of rotation opposite to the driving rotation direction of the pump wheel 7.

The disc stack of the bridging coupling 19, which is actuatable in the conventional way by the axial piston 17 via a thrust ring, is clamped on the primary side to the converter housing 3 by the flange and, on the secondary side, is connected to the hub 51 by a torsion damper 63.

A pressure-medium inflow system, indicated schematically by the numeral 23 has a converter inflow pressure $W_{to}$ in a delivery channel 59 which extends between the outer hollow shaft 47 and the stator shaft 55. The delivery channel 59 communicates with the hydrodynamic working circuit at an annular gap 25 between the inflow end of the pump wheel 7 and the outflow end of the guide wheel 13.

A converter flow-off pressure $W_{from}$ can be maintained in a pressure-medium discharge system indicated generally by the numeral 27. A connected delivery channel 61 extends between the stator shaft 55 and the turbine-wheel shaft 53 and communicates with the hydrodynamic working circuit at an annular gap 29 between the outflow end of the turbine wheel 11 and the inflow end of the guide wheel 13.

The radial housing wall 9 and the axial piston 17 define a working pressure chamber 21, to which a working-pressure line 15 is connected via housing channels 65 and a shaft channel 67 communicating with these channels 65 and being provided in the turbine-wheel shaft 53.

To affect the working pressure in the working-pressure chamber 21, a sensor 33 is provided and has a cylinder bore 35 with a separating piston 37 received axially displaceably in the bore 35. The piston 37 divides the cylinder bore 35, which is closed at each end face, into two pressure chambers 69, 71. The pressure chamber 69 constantly communicates with the working-pressure line 15. A control-pressure line 73 is connected between a pressure regulating valve 31 and the other pressure chamber 71. In the axial direction pointing towards the pressure chamber 69, the separating piston 37 is biased in an axial direction by a sensor spring 89 which is arranged in the pressure chamber 71 and supported at the housing, and by a reference control pressure W set by the pressure-regulating valve 31 via the control-pressure line 73. The separating piston 37 can be subjected to the working pressure of the working-pressure line 15 in the opposite axial direction.

On the outlet side of sensor 33, a controlled-delivery line 87 extends from a coupling control valve 39 and is connected to the working pressure line 15 both by a constant throttle 41 and by a bypass control valve 43 connected in parallel to the throttle 41. The bypass control valve 43 has a valve connection 81 connected to the working-pressure line 15 and a valve connection 83 connected to the controlled-delivery line 87. These valve connections 81, 83 open into the cylinder bore 35 of the sensor 33. The separating piston 37 is held in its illustrated rest pressure-relieved position 77 under the bias of the sensor spring 89, so that the piston 37 is supported at the housing by a bolt-like piston stop 75.

The separating piston 37 possesses, as an integral part of the bypass control valve 43, a middle circumferential groove 85 which, in the illustrated position of rest 77, brings the two valve connections 81 and 83 into mutual open communication, so that the throttle 41 is bypassed and the delivery line 87 is connected to the working-pressure line 15 in an unthrottled manner. The groove side wall 79 bounding the circumferential groove 85 in the axial direction of the pressure chamber 69 also constitutes a control edge which interacts with the valve connection 81, in such a way that, when the sensor spring 89 is compressed, separating piston 37 shuts off the valve connections 81 and 83 from one another by means of its control edge 79. This results in the throttle 41 being now inserted as a connection between the controlled delivery line 87 and the working-pressure line 15.

The coupling control valve 39 is held in its illustrated cutoff position by a valve spring 91. The controlled-delivery line 87 is connected to a relieved zero connection 101. Counter to the effect of the valve spring 91 the coupling control 39 can be changed over against the bias of valve spring 91 by the control pressure of control-pressure line 95 into an engagement position in which the controlled-delivery line 87 is disconnected from the zero connection 101 and is connected to a main-pressure line 93, in which in a constant main pressure can be set in a known manner which need not be further described.

The control-pressure line 95 is connected to a valve chamber 103 of an electromagnetic change-over control valve 97 which, in turn, is connected to an electronic control unit (not shown) via control line 99. The valve 97 is likewise connected to the main-pressure line 93. When the change-over control valve 97 is not energized with current, the valve chamber 103 is disconnected from the main-pressure line 93 and is connected to a pressure-relieved zero connection. When the change-over control valve 97 is energized, the valve chamber 103 is connected to the main-pressure line 93, with the zero connection being shut off.

A regulating piston 109 is received axially displaceably in a valve 31. The piston 109 acts on a supply connection 111 which is connected to the main-pressure line 93 and opens into the valve bore, on a regulating connection 113 which is connected to the control-pressure line 73 and opens into the valve bore, and on a pressure-relieved zero connection 115 which opens into the valve bore. The regulating piston 109 is held in its illustrated end position, in which the supply connection 111 is shut off and the regulating connection 113 is connected to the pressure-relieved zero connection 115, by a regulator valve spring 105 arranged in a valve chamber 107 and additionally by the reference control pressure W of the control-pressure line 73 which is also connected to this valve chamber 107.

The valve chamber 107 is bounded by one end face of the regulating piston 109. The other end face of the regulating piston 109 delimits another valve chamber 121 which is connected to the pressure-medium discharge system 27 via a control-pressure line 123. A middle annular piston pressure surface of the regulating piston 109 works in a further valve chamber 117 which is connected to the pressure-medium feed system 23 via control-pressure line 119. The control pressures of the valve chambers 117 and 121 subject the regulating piston 109 to pressure respectively in opposite directions to the regulator valve spring 105.

Because of an annular gap opening into the housing interior 5 between the outflow end of the pump wheel 7 and the inflow end of the turbine wheel 11, the converter counter pressure $W_g$ (i.e., the pressure in housing interior 5) depends on the hydrodynamic pressure of the working circuit of the bladed wheels 7, 11 and 13.

In order to limit the hydraulic losses in the torque converter 1 to a minimum, the converter is bridged when a predetermined speed is exceeded. However, during the load shifts of the following multi-step transmission, the bridging coupling 19 may transmit only a reduced torque in order to prevent the servo-members of the coupling 19 from being subjected to excessive load.

For reasons of space, the bridging coupling 19 forms a constructional unit with the torque converter 1 with the result that the rear side of the axial piston 17 is subjected to the converter counter pressure $W_g$ of the housing interior 5. The torque transmittable by the bridging coupling 19 is therefore proportional to the resulting pressure difference between the working pressure and converter counter pressure $W_g$, the working pressure being the actuating pressure of the bridging coupling 19. To take this characteristic into account, the control is designed so that the working pressure to be set is obtained from the spring force of the sensor spring 89 and from the reference control pressure W in the pressure chamber 71. Since the actual converter counter pressure $W_g$ additionally dependent on the state of slip of the converter 1 is not available, the reference control pressure W is alternatively formed, with the aid of any ratio of the two available pressures $W_{to}$ (converter inflow) and $W_{from}$ (converter flow-off), the pressure-regulating valve 31.

An electronic transmission control is used to control the change-over control valve 97 as a function of the turbine speed and of the output speed of the transmission. By energizing the change-over control valve 97, the coupling control valve 39 is subjected to control pressure and is switched into the right-hand end position counter to the spring force so that the delivery line 87 is subjected to the pressure of the main line 93 and the filling of the bridging coupling 19 begins via the valve connection 83. The pressure in the working-pressure chamber 21 is equal to the resulting converter counter pressure $W_g$ and the frictional pressure corresponding to the frictional forces of the axial piston 17.

So that the filling of the bridging coupling 19 can take place as quickly as possible, the throttle 41 is bridged by the bypass formed by the circumferential groove 85 of the separating piston 37. During filling, the sensor 33 regulates the working pressure. As soon as the working pressure is higher than the pressure value predetermined by the reference control pressure W and the spring 89, the separating piston 37 closes the bypass with the control edge 79, and filling can now take place via the throttle 41. The working pressure thereby falls again, and the bypass 85 is opened once more.

The energization of the change-over control valve 97 is cut off below a specific driving speed. The coupling control valve 39 is thereby switched back into the initial position shown by the spring 91 and the delivery line 87 is relieved via the zero connection 101, so that the sensor 33 runs back into the basic right-hand stop position once again. Under these circumstances, the pressure in the bridging coupling 19 is quickly reduced until the coupling 19 is emptied.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A control device for a pressure-actuatable bridging coupling of a hydrodynamic torque converter having an engine driven converter housing, with a housing interior of the converter housing, having respectively a pump wheel, a turbine wheel and a guide wheel, and with the converter housing having a radial housing wall, an actuator element with an annular axial piston for actuating the bridging coupling, a working-pressure chamber for subjecting the axial piston to pressure, a hydrodynamic working circuit positively controlled by blades between the pump wheel, the turbine wheel and the guide wheel, a pressure-medium feed system having a converter inflow pressure, a pressure-medium discharge system having a converter flow-off pressure, and a working-pressure line, the pump wheel, the turbine wheel, the guide wheel and the axial piston being arranged in the housing interior, such that the pump wheel is rotationally fixed to the converter housing, the turbine wheel is arranged axially between the radial housing wall and the pump wheel, the axial piston is arranged axially between the turbine wheel and the radial housing wall, the working-pressure chamber is enclosed by the radial housing wall and the axial piston and is connected to the working-pressure line, and the working circuit is connected both to the pressure-medium feed system between the pump wheel and the guide wheel and to the pressure-medium discharge system between the turbine wheel and the guide wheel, wherein a pressure-regulating valve is connected to the pressure-medium feed system, to the pressure-medium discharge system and to a sensor and, as a function both of the converter inflow pressure and of the converter flow-off pressure, sets a reference control pressure analogous to the internal housing pressure of the converter housing, and a separating piston guided axially displaceably in a cylinder bore of the sensor, also connected to the working-pressure line, is selectively operable by a resilient element and by the reference control pressure, or the working pressure of the working pressure chamber.

2. The control device according to claim 1, wherein a coupling control valve is connected to the working-pressure line, via a throttle and, bypassing the throttle, a bypass control valve operable in dependence on the sensor, the bypass control valve being held in a position cutting off the throttle when the working pressure is equal to or lower than the reference control pressure reduced by an amount of the tension of the resilient element.

3. A control method for a pressure-actuatable bridging coupling of a hydrodynamic torque converter, comprising the steps of
setting a reference control pressure analogous to an internal housing pressure as a function of converter inflow pressure and converter flow-off pressure, and
selectively operating a sensor operatively associated with a working pressure line connected with a working chamber in the converter under the influence of the reference control pressure or a working pressure of the working chamber to avoid an increase of pressure of a hydrodynamic working circuit of the converter when engaging the bridging coupling.

* * * * *